3,271,349
POLYSTYRENE METHODS AND PRODUCTS
Harold A. Levey, 812733 Oleander St., and Edward S. Fonda, % Alabama Chemical Co., 2721 Decatur, both of New Orleans, La.
No Drawing. Filed July 18, 1963, Ser. No. 296,099
5 Claims. (Cl. 260—33.6)

The present invention relates to polystyrene and more particularly to the treatment of certain waste products of polystyrene manufacture to render these products suitable for commerical usage. The methods and products of this invention are relatively inexpensive and uncomplicated yet, convert essentially waste polystyrene materials into commercially usable forms.

The production of styrene monomer by condensing ethylene with benzene to form ethylbenzene which is then dehydrogenated to yield styrene is well known. Various catalysts such as aluminum chloride and heat are employed. Subsequent polymerization by such well known methods as bulk or solution polymerization is also known. Frequently during commercial production of styrene monomer, styrene residues, also known as "styrene bottoms" are produced which have little known value with the possible exception of their fuel value. These styrene residues are normally heavy bodied, viscous, plastic masses of more or less amber color containing a high percentage of polystyrene resins admixed with vinyl toluene, diethylbenzenes, ethylbenzene, cumene, sulphur and minute amounts of other degradation products of the reaction. The styrene bottoms since they contain high percentages of polystyrene would seem to be potentially usable for normal polystyrene applications. However, these materials, possibly because of their sulphur content, are extremely vile smelling and malodorous rendering them highly objectionable for normal applications.

In addition to objectionable odors certain problems arise in employing styrene bottoms for coating, impregnating and adhesive aplications. The drying rate of the styrene bottoms is frequently excessively long. Normally the bottoms are removed from the reaction vessels or retorts where they are produced by use of a solvent such as toluene. When the styrene bottoms are then used as a coating solution, it is found that it frequently takes as long as several days at room temperature to completely dry the material. Other problems arise as to brittleness of molded hardened products made from styrene bottoms. Frequently suitable plasticizers cannot be found for this material since most known plasticizers tend to undergo synerisis or "sweating out" when used in sufficient amount to prevent brittleness of the material in various usages. This same problem is also found in conventional commercial polystyrene polymers.

It is an important object of this invention to provide a method for removing undesirable odors from styrene bottoms.

It is another object of this invention to provide a method in accordance with the preceding object which is relatively uncomplicated and can be carried out in substantially conventional equipment and with minimized cost.

It is a further object of this invention to provide a method in accordance with the preceding objects which additionally results in relatively fast drying products.

It is still a further object of this invention to provide a method in accordance with the preceding objects which does not have an adverse effect on the polystyrene component of the styrene bottoms thus allowing the treated styrene bottoms to be used for conventional polystyrene commercial applications.

It is still a further object of this invention to provide a plasticized polystyrene which is highly flexible and retains its flexible nature without sweating out of the incorporated plasticizer over long periods of time.

Surprisingly it has been found that styrene bottoms may be treated with oxidizing agents to remove unwanted odors without oxidizing the polystyrene content of the styrene bottoms to an unusable form. In an alternate method of removing odors in accordance with this invention, styrene bottoms are treated with a solvent for diethylbenzene normally contained in the bottoms but which solvent is a non-solvent for the polystyrene. Surprisingly this treatment not only removes unwanted odors but in addition speeds up the drying rate of styrene bottoms, greatly facilitating their use for coating and film forming applications. In an alternate embodiment of this invention, styrene bottoms which have been deodorized are plasticized with certain organic esters giving them high flexibility and rendering them suitable for use in film forming application as well as other applications where non-brittle polystyrene compositions of materials are normally used. The plasticizers may be incorporated in preselected amounts to form non-drying, non-hardening tacky film surfaces of the pressure sensitive type. This feature permits such compositions to bond to a wide variety of surfaces. In addition to the use of these plasticizers in treated styrene bottoms, they may also be employed in commercial grade polystyrene.

The styrene residues or styrene bottoms used in accordance with this invention are well known in the industry, as above described. They are normally solutions of a major percentage by weight of polystyrene along with other ingredients in toluene. A representative analysis of principal constituents of the styrene bottoms is:

| | Percent by weight |
|---|---|
| Polystyrene | 62 |
| Styrene monomer | 5 |
| Crystalline solids comprising a major portion of cumene | 3 |
| Sulphur (powdered) | 2 |
| Di- and mono ethyl benzenes | 2 |
| Toluene | 26 |

Various isomers of di and mono ethyl benzenes may be present as well as minor amounts of heat degradation products of the materials listed. Small amounts of vinyl toluene and triethyl benzenes are also normally present or part of the constituent listed above as di- and monoethyl benzenes. The particular amount of toluene in the styrene bottoms may vary considerably. Normally toluene is used to remove the material from chemical retorts after the normal operations have ceased. Toluene is a solvent and is normally used in the range of 10% to 80% by weight of the whole. Other solvents for polystyrene such as benzene, xylenes, etc., may be used in place of toluene although toluene is preferred because of its low cost and ready availability. The polystyrene found in styrene bottoms normally has a degree of polymerization equal to an average molecular weight of 800 with a corresponding relatively low viscosity. However the particular degree of polymerization and average molecular weight will vary considerably, depending upon the actual conditions under which the bottoms are produced. Generally the average molecular weight is in the range of approximately 228 to 1200 as measured by Staudinger super-centrifugal molecular weight measurement. In general each of the above listed components may be present in the styrene bottoms within a range of plus or minus 50% by weight of the figures given.

We have found that the styrene bottoms which are principally polystyrene solutions are particularly useful as coating compositions, impregnating and sealing compounds and adhesives or bonding agents in much the same manner that conventional polystyrene solutions may be used. It is only necessary to first deodorize the styrene bottoms in accordance with this invention.

According to the preferred method of this invention, styrene bottoms are deodorized by subjecting them to treatment with an oxidizing agent. Preferably, the oxidizing agent is employed at room temperature, although elevated temperatures may be used for short periods of time in some cases. By using oxidizing agents effective at room temperature, thermal degradation is prevented and embrittlement of the polystyrene avoided. It is preferred to employ hydrogen peroxide, sodium hypochlorite (based upon an available chlorine content of 1–3% by weight) or sodium perborate in water solution (available oxygen yield of ½–2% by weight) as oxidizing agents in the method of this invention. These agents are active at room temperature to remove malodorous constituents of the styrene bottoms. It is also possible to use other oxidizing agents which are conventionally known, so long as they do not degrade the polystyrene or in any way alter the characteristics of the styrene bottoms to a point where the resulting material is no longer serviceable for the uses intended.

In a specific example of this embodiment of the invention styrene bottoms as set forth in column 2 are further diluted with toluene to a solids content of 40%. A 30% concentration of hydrogen peroxide water solution is diluted with five volumes of water to bring the hydrogen peroxide content to a level of 6% by weight available hydrogen peroxide. 1 liter of the polystyrene bottoms is mixed with 2 liters of 6% hydrogen peroxide solution in a stainless steel container. The composite mixture is agitated in both vertical and horizontal planes with a high speed stirrer, such as a twin impeller with shaft at 30° off the vertical for 20 minutes at standard room temperature (25 deg. C.). The reaction mixture is then allowed to stand without agitation for five hours until a sharp separation of an upper layer of styrene bottoms solution and a lower layer of the depleted hydrogen peroxide solution is formed. The lower layer is then drained or decanted. The styrene bottoms solution is then dried by the addition of ½% by weight of calcium chloride flakes. The resulting modified styrene bottoms solution is then substantially free of moisture. The resulting solution may be applied to a surface such as wood and allowed to dry. A coating is formed which does not possess the undesirable odor which previously characterized this material. Upon aging of the coating for 8 days and longer, the original odor does not recur.

When 0.4 liter of sodium hypochlorite having a chlorine content of 1–3% by weight or 1.2 liters of sodium perborate in aqueous solution with an available oxygen yield of ½ to 2% are employed in place of the hydrogen peroxide, similar results are obtained. Other oxidation agents such as organic peroxides, ultra violet light, exposure to radioactive isotopes and oxygen may also be employed although precautions must be taken to prevent degeneration of the polystyrene in such cases. The quantity or dilution of oxidizing solution used is not critical but must vary with the intensity of the odor of the styrene bottoms.

It should be understood that while a specific example has been shown above, many varieties are possible. The polystyrene solids content of the styrene bottoms solution may vary within the ranges of 10 to 85% and preferably 30–50% by weight. The particular volume of styrene bottoms solution to oxidizing agent solution may vary considerably, although a 4 to 1 ratio is preferred. It is preferred to employ metal containers for this reaction which are made of materials other than iron or steel such as aluminum, stainless steel, Monel metal and the like. The period of agitation may vary from 5 to 30 minutes and higher, depending upon the particular volume of material being treated. Similarly in some cases the temperature may be raised above room temperature and shorter time periods employed, however, the use of temperatures above 35° C. is not preferred. The particular period of time before decantation after mixing may vary from 30 minutes to several hours, depending again upon the particular volume of materials used and the time period of agitation. The water removal step may be eliminated in some cases, although it is preferred to eliminate moisture from the final product.

The resulting coating solution will adhere to wood, metal, paper, fiberboard and the like and may also be used for impregnating, sealing and adhesive applications where desired.

In another embodiment of this invention, styrene bottoms are treated to remove undesirable odors and in addition the drying rate of the material is substantially increased. Surprisingly, it has been found that by removing diethyl benzenes from the styrene bottoms solution, these solutions will dry or harden in a matter of minutes rather than the normal periods of at least 24 and sometimes 48 hours and higher required at room temperature. It is preferred to remove the diethyl benzenes by means of selective solvent action with conventional solvents for these materials. Preferably ethanol is used. Other solvents which selectively dissolve diethyl benzenes without removing or dissolving polystyrene and which are incompatable or immiscible with toluene or the solvent employed in the styrene bottoms may also be employed. It is believed that malodorous constituents of styrene bottoms are mixed or combined with the diethyl benzenes and are removed therewith by the solvent. The ethanol may be highly concentrated, that is 95% and above, but is preferably mixed with a minor percentage of water or other particular alcohols as will be described. The ethanol or other alcohols used may be denatured with 3 to 5% of conventional denaturing agents, such as kerosene, methanol, and methyl ethyl ketone. In place of ethanol, methyl and isopropyl alcohols may be substituted in some cases. Methyl and isopropyl alcohols are advantageous because of their lower price and the fact that they do not form azeotropic boiling mixtures with diethyl benzenes. Thus, the alcohols may be easily separated by conventional distilling techniques and reused in the procedure.

It is preferred that the alcohol be diluted with from 2 to 20% by weight of water or certain polyhydric alcohols including ethylene glycol, propylene glycol, glycerol and polyethylene glycols of molecular weights to 600. When polyhydric alcohols are used it is preferred that they may be employed in the amounts of 2–12% by weight of the ethanol content. The amount of alcohol to styrene bottoms used may vary considerably depending upon the speed of recovery of diethyl benzenes required and the total volume of the styrene bottoms to be separated. A ratio as low as 25% of the alcohol to toluene phases up to as high as 200% of alcohol to toluene phases may be used. The separation may be carried out by the use of a single washing of the styrene bottoms with the alcohol phase or more than one washing. As would be expected, it is preferred to employ a plurality of separate washings with small amounts of alcohol rather than to use the aggregate amount in a single washing.

The use of water and polyhydric alcohols in conjunction with the ethanol, methyl, or isopropyl alcohol used as the major selective solvent is effective in preventing carrying off small amounts of toluene in the alcohol phase upon decantation. When water is used in amounts of approximately 20% and ethanol 80% substantially no toluene is admixed with the ethanol water mixture. However, if one exceeds this limit, the solubility of the diethyl benzenes in the ethanol layer is materially reduced and may pass below a critical point at which the ethanol washing treatments fail to remove the undesirable diethyl benzenes. Even if a small amount of ethanol is retained in the toluene layer after the decantation procedure, it has little effect on the film deposition of the resulting mixture and such mixtures can be advantageously used for coating compositions and other purposes. If desired, in some cases any residual alcohol may be separated for reuse by simple distillation operations in a conventional rectifying column.

In a specific example of the second embodiment of this invention styrene bottoms of the type set forth in column 2 were treated at room temperature by mixing 38% by weight of this solution with 12% by weight of toluene. 45% by weight denatured 95% ethanol and 5% by weight of water were added to the mixture in a conventional separatory funnel. The aggregate volume of the liquids was about 2 liters. The mixture was shaken and the alcohol-water layer which separated after standing, was removed. When the solution was spread over a textile material it hardened at room temperature in approximately 5 minutes to a smooth, thin film. Styrene bottoms in untreated form when spread over the same surface, did not dry for a period of 36 hours at room temperature.

In another specific example of the modification of this invention, a mixture was formed of styrene bottoms as employed in the previous example in an amount of 42% by weight, toluene 20% by weight, methanol 30% by weight, water 4% by weight and 4% by weight polyethylene glycol having a molecular weight of 400.

The procedure of the preceding example was employed and a similar product resulted.

In other examples, each of the ingredients of the examples was varied in the range of plus or minus 10% of the particular percentages noted without any change in resutls achieved.

In still another embodiment of this invention butyl benzyl phthalate and/or di-benzyl phthalate in amounts of 15 to 80% by weight of polystyrene is incorporated into polystyrene bottoms which have had vile smelling odors removed in accordance with the preceding examples. When used in amounts of 15 to 25% by weight calculated on the basis of the polystyrene contained in the polystyrene bottoms with which they are used, a substantially permanent plasticized material which may be made into coating films for various uses is obtained. However, these plasticizers may be used in amounts of 25 to 80% by weight of the polystyrene resin content of the polystyrene bottoms to form a non-drying non-hardening, tacky film surface on films formed of these materials. In a specific example butyl benzyl phthalate was used in amounts of 40% by weight of the polystyrene resin content of the product of the first example given in the specification. The butyl benzyl phthalate was mixed into the solution by stirring for 30 minutes. On coating the resultant solution to form a thin film approximately .005" thick the film was formed with tacky outer surfaces which could be adhered to wood, textiles and paper materials. These plasticized materials are found to be highly flexible and in addition, permanent in that no "sweating out" of the plasticizer was observed after periods of 1 to 24 hours at temperatures of 20 to 80° C. Such plasticized materials are also suitable for use as pressure sensitive adhesives or bonding agents in their tacky form and adhere to many surfaces which the non-plasticized materials do not adhere.

It is evident that those skilled in the art may now make numerous modifications of and departures from the specific embodiments of the invention described herein, without departing from the inventive concepts. For example, various antioxidants, fillers and dyes may be added to the resulting products in accordance with conventional practice. Therefore, the breadth of this invention is to be construed as limited only by the spirit and scope of the appended claims.

What is claimed is:

1. A method of removing objectionable odors from polystyrene containing malodorous styrene bottoms comprising diluting said styrene bttoms in a solvent to form a solution having 10%–85% solids content and thoroughly mixing said solution with an oxidizing agent solution having a density different from the density of said first-mentioned solution, for a period of time sufficient to remove undesirable odors from said styrene bottoms substantially at room temperature,
   said oxidizing agent being selected from the group consisting of hydrogen peroxide, sodium hypochlorite and sodium perborate,
   permitting said first-mentioned solution to separate from said oxidizing agent solution to form two distinct layers,
   and decanting said oxidizing agent solution from said first-mentioned solution.

2. A method of removing objectionable odors from polystyrene containing,
   malodorous styrene bottoms comprising diluting said styrene bottoms in a solvent to form a solution having 10–85% solids content and thoroughly mixing said solution with an oxidizing agent for a period of time sufficient to remove undesirable odors from said styrene bottoms said oxidizing agent being non-degrading to polystyrene contained in said styrene bottoms, and separating said oxidizing agent from said solution.

3. A method in accordance with claim 2 wherein said solvent is toluene.

4. A method in accordance with claim 3 wherein said oxidizing agent is selected from the group consisting of hydrogen peroxide, sodium hypochlorite and sodium perborate.

5. A method in accordance with the method of claim 2 wherein said solution is treated with said oxidizing agent at room temperature.

References Cited by the Examiner
UNITED STATES PATENTS

| | | | |
|---|---|---|---|
| 2,493,965 | 1/1950 | Haefele. | |
| 2,548,318 | 4/1951 | Norris | 260—34.2 |
| 2,670,319 | 2/1954 | Ayers et al. | 208—196 |
| 2,691,008 | 10/1954 | Grim. | |
| 2,929,855 | 3/1960 | O'Connor et al. | 260—669 |
| 3,090,820 | 5/1963 | Walker | 260—669 |

OTHER REFERENCES

Doolittle, The Technology of Solvents and Plasticizers, John Wiley and Sons, Inc., pp. 5–8.

Mellan, Industrial Plasticizers, The MacMillan Co., 1963; page 196.

MORRIS LIEBMAN, *Primary Examiner.*

L. T. JACOBS, *Assistant Examiner.*